United States Patent
Kim (10) Patent No.: US 9,525,553 B2
(45) Date of Patent: Dec. 20, 2016

(54) SYSTEM AND METHOD FOR PROVIDING DIGITAL SIGNATURE BASED ON MOBILE TRUSTED MODULE

(71) Applicant: Electronics and Telecommunications Research Institute, Daejeon (KR)

(72) Inventor: Dae-Won Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 312 days.

(21) Appl. No.: 14/224,616

(22) Filed: Mar. 25, 2014

(65) Prior Publication Data

US 2015/0074414 A1    Mar. 12, 2015

(30) Foreign Application Priority Data

Sep. 9, 2013 (KR) .................. 10-2013-0107948

(51) Int. Cl.
H04L 9/32    (2006.01)

(52) U.S. Cl.
CPC ............ H04L 9/3247 (2013.01); H04L 9/321 (2013.01); H04L 9/3226 (2013.01); H04L 9/3234 (2013.01); H04L 9/3263 (2013.01); H04L 2209/80 (2013.01)

(58) Field of Classification Search
CPC .................................................. H04L 9/3247
USPC ...................................................... 713/176
See application file for complete search history.

(56) References Cited

U.S. PATENT DOCUMENTS

| 8,176,324 B1* | 5/2012 | Krishnamurthy ..... G06F 3/0236 380/45 |
| 2003/0217258 A1* | 11/2003 | Bade ................... H04L 63/0442 713/150 |
| 2004/0073809 A1* | 4/2004 | Wing Keong .......... G06F 21/36 726/7 |
| 2005/0021668 A1* | 1/2005 | Beesley .............. H04L 63/1416 709/217 |
| 2006/0206919 A1* | 9/2006 | Montgomery .......... G06F 21/31 726/2 |
| 2007/0300057 A1* | 12/2007 | Corcoran ................ G06F 21/34 713/154 |

(Continued)

FOREIGN PATENT DOCUMENTS

KR    10-1129894    3/2012

Primary Examiner — Andrew Georgandellis
(74) Attorney, Agent, or Firm — Staas & Halsey LLP (57) ABSTRACT

Provided are a system and method for providing a digital signature based on a mobile trusted module (MTM). The system includes a control unit configured to activate a mobile application and receive selection of one certificate in a previously set certificate list from a user through the activated mobile application, an MTM configured to generate based on the selected certificate a keypad image in which buttons are irregularly arranged, an MTM table for converting keypad touch information into an actual value, and a terminal table for converting keypad image coordinates into an area, and put a digital signature on the certificate using a certificate password input by the user based on the keypad image, the MTM table, and the terminal table to generate a digital signature value, and a communication unit configured to encrypt the generated digital signature value and transmit the encrypted digital signature to an authentication server.

16 Claims, 4 Drawing Sheets

(56) References Cited

U.S. PATENT DOCUMENTS

| | | | |
|---|---|---|---|
| 2008/0115078 A1* | 5/2008 | Girgaonkar | G06F 3/04886 715/773 |
| 2009/0044282 A1* | 2/2009 | Govindaraju | G06F 21/83 726/27 |
| 2013/0024204 A1* | 1/2013 | Hendrix | G06Q 30/0601 705/2 |
| 2013/0305392 A1* | 11/2013 | Bar-El | H04L 9/08 726/29 |

* cited by examiner

| Xstart | Ystart | Xend | Yend | Area |
|--------|--------|------|------|------|
| ... | ... | ... | ... | ... |
| X1 | Y1 | X2 | Y2 | 12 |
| ... | ... | ... | ... | ... |

FIG. 4C

| Area | Key |
|------|-----|
| ... | ... |
| 12 | B |
| ... | ... |

SYSTEM AND METHOD FOR PROVIDING DIGITAL SIGNATURE BASED ON MOBILE TRUSTED MODULE

CROSS-REFERENCE TO RELATED APPLICATION

This application claims priority to and the benefit of Korean Patent Application No. 10-2013-0107948, filed on Sep. 9, 2013, the disclosure of which is incorporated herein by reference in its entirety.

BACKGROUND

1. Field of the Invention

The present invention relates to a digital signature providing method, and more particularly, to a system and method for providing a digital signature based on a mobile trusted module (MTM) which cause the MTM prepared in a mobile device to generate a keypad image in which buttons are irregularly arranged, an MTM table for converting keypad touch information into an actual value, and a terminal table for converting keypad image coordinates into an area, store keypad coordinate values input by a user and the number of touches made by the user based on the generated keypad image, MTM table, and terminal table, and verify whether an actual value converted according to the stored keypad coordinate values and number of touches is the same as a previously set password.

2. Discussion of Related Art

The recent explosive increase in the number of mobile terminals has led to an increasing number of monetary transactions performed through mobile terminals. As shopping, banking, etc. are enabled through mobiles terminals, a demand for improvement in the reliability and security of mobile electronic transactions is increasing.

For an electronic transaction involving a predetermined amount of money or more, an authorization certificate issued by an organization designated by the government, an Internet secure payment certificate issued by a payment service provider, etc. is used.

Public-key encryption is applied to such a certificate. Therefore, an encrypted private key of a user is decrypted using a certificate password input by the user, and the certificate bearing a digital signature is transmitted to a service provider using the decrypted private key, so that the reliability and security of the transaction may be ensured.

For this reason, it is the core of security of mobile electronic transactions to safely protect an encrypted private key of a user and a certificate password for decrypting the encrypted private key from hacking.

However, a certificate and an encrypted private key of a user are stored in an internal or external flash memory, and thus may easily leak out if a hacking application can access a file system using a vulnerability of the mobile terminal.

To solve this problem, a hardware security module (HSM) is used. An encrypted private key of a user stored in an HSM does not leak out and thus is safe.

However, a hacker may steal an HSM password and a certificate password input by a user using a message hooking application installed in a mobile terminal, and obtain a digital signature from the HSM.

Such a message hooking program may directly steal a key-input value using a key-input interrupt in a terminal having no key-input security function, or steal input information, which is obtained after an indirect key value, such as coordinate values, is converted into an actual key value, by memory hacking in a terminal having a key-input security function.

Therefore, a digital signature generated without interoperation of security functions between a hardware security module, such as an HSM, and an application using the hardware security module has poor security.

SUMMARY OF THE INVENTION

The present invention is directed to a system and method for providing a digital signature based on a mobile trusted module (MTM) which cause the MTM prepared in a mobile device to generate a keypad image in which buttons are irregularly arranged, an MTM table for converting keypad touch information into an actual value, and a terminal table for converting keypad image coordinates into an area, store keypad coordinate values input by a user and the number of touches made by the user based on the generated keypad image, MTM table, and terminal table, and verify whether an actual value converted according to the stored keypad coordinate values and number of touches is the same as a previously set password.

According to an aspect of the present invention, there is provided a system for providing a digital signature based on an MTM, including: a control unit configured to activate a mobile application and receive selection of one certificate in a previously stored certificate list from a user through the activated mobile application; an MTM configured to generate a keypad image in which buttons are irregularly arranged, an MTM table for converting keypad touch information into an actual value, and a terminal table for converting keypad image coordinates into an area based on the selected certificate, and put a digital signature on the certificate using a certificate password input by the user based on the keypad image, the MTM table, and the terminal table to generate a digital signature value; and a communication unit configured to transmit the generated digital signature value and certificate information to an authentication server.

The control unit may receive the previously stored certificate list from the MTM through the activated mobile application, and transmit the selected certificate to the MTM when the one certificate is selected from the received certificate list by the user.

The control unit may receive the keypad image and the terminal table from the MTM, and transmit information on the certificate password input based on the received keypad image by the user to the MTM.

The MTM may receive the certificate password information from the control unit, convert the received certificate password information into the certificate password based on the MTM table, and store the certificate password.

The control unit may receive MTM password information from the user based on the keypad image after completion of input of the certificate password information, and may receive a public key from the authentication server and transmit the received public key and the MTM password information to the MTM after completion of input of the MTM password information.

The MTM may compare the MTM password information with a previously stored MTM password when the MTM password information is received from the control unit, and may put the digital signature on the certificate selected by the user using the stored certificate password to generate the digital signature value when a result of the comparison indicates that the MTM password information is the same as the previously stored MTM password.

The MTM may encrypt the generated digital signature value and the certificate information using the public key, and transmit the encrypted digital signature value and certificate information to the control unit.

The control unit may transmit the encrypted digital signature value and certificate information to the authentication server through the communication unit.

According to another aspect of the present invention, there is provided a method of providing a digital signature based on an MTM, including: activating, at a control unit, a mobile application and receiving selection of one certificate in a previously stored certificate list from a user through the activated mobile application; generating, at an MTM, a keypad image in which buttons are irregularly arranged, an MTM table for converting keypad touch information into an actual value, and a terminal table for converting keypad image coordinates into an area based on the selected certificate, and putting a digital signature on the certificate using a certificate password input by the user based on the keypad image, the MTM table, and the terminal table to generate a digital signature value; and encrypting, at the MTM, the generated digital signature value using a public key and transmitting the encrypted digital signature value to an authentication server.

The receiving of the selection may include receiving the previously stored certificate list from the MTM through the activated mobile application, and transmitting the selected certificate to the MTM when the one certificate is selected from the received certificate list by the user.

The generating of the digital signature value may include receiving, at the control unit, the keypad image and the terminal table from the MTM and transmitting information on the certificate password input based on the received keypad image by the user to the MTM.

The generating of the digital signature value may further include receiving, at the MTM, the certificate password information from the control unit, converting the received certificate password information into the certificate password based on the MTM table, and storing the certificate password.

The generating of the digital signature value may further include: receiving, at the control unit, MTM password information from the user based on the keypad image after completion of input of the certificate password information; and receiving, at the control unit, the public key from the authentication server and transmitting the received public key and the MTM password information to the MTM after completion of input of the MTM password information.

The generating of the digital signature value may include: comparing, at the MTM, the MTM password information with a previously stored MTM password when the MTM password information is received from the control unit; and putting, at the MTM, the digital signature on the certificate selected by the user using the stored certificate password to generate the digital signature value when a result of the comparison indicates that the MTM password information is the same as the previously stored MTM password.

The transmitting of the encrypted digital signature value may include encrypting, at the MTM, the generated digital signature value and certificate information using the public key, and transmitting the encrypted digital signature value and certificate information to the control unit.

The transmitting of the encrypted digital signature value may further include transmitting, at the control unit, the encrypted digital signature value and certificate information to the authentication server.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, a system and method for providing a digital signature based on a mobile trusted module (MTM) according to exemplary embodiments of the present invention will be described with reference to the accompanying drawings. Description will be made in detail, centering on aspects required to understand operation and effects in accordance with the present invention.

While components of the present invention are described, components having the same name may be given different reference numerals according to drawings, or the same reference numeral even in different drawings. However, neither of these cases implies that the corresponding components have different functions according to exemplary embodiments, or the same function in different exemplary embodiments. Rather, functions of each component should be determined based on the description of the component in the corresponding exemplary embodiment.

In particular, the present invention proposes a new digital signature providing method in which an MTM prepared in a mobile device is caused to generate a keypad image in which buttons are irregularly arranged, an MTM table for converting keypad touch information into an actual value, and a terminal table for converting keypad image coordinates into an area, store keypad coordinate values input by a user and the number of touches made by the user based on the generated keypad image, MTM table, and terminal table, and verify whether an actual value converted according to the stored keypad coordinate values and number of touches is the same as a previously set password.

Here, an MTM is a hardware module that provides more varied security functions than an existing hardware security module (HSM), and may be installed in the form of a chip or card in a mobile device to perform the security functions.

Figure 1:
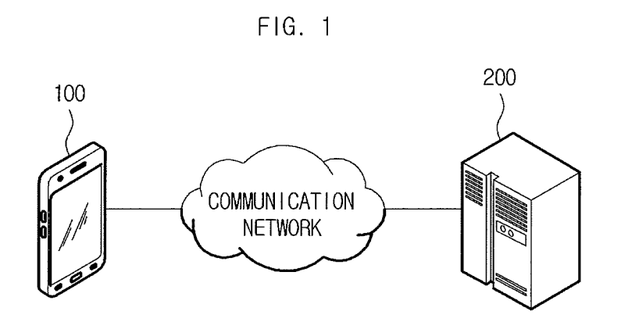
FIG. 1 is a diagram illustrating a system for providing a digital signature according to an exemplary embodiment of the present invention.

FIG. 1 is a diagram illustrating a system for providing a digital signature according to an exemplary embodiment of the present invention.

As shown in FIG. 1, a system for providing a digital signature based on an MTM according to an exemplary embodiment of the present invention may include a mobile device 100, an authentication server 200, and so on.

The mobile device 100 may activate a mobile application, operate in conjunction with an MTM prepared therein through the activated mobile application to generate a keypad image in which buttons are irregularly arranged, an MTM table for converting keypad touch information into an actual value, and a terminal table for converting keypad image coordinates into an area, generate a digital signature value based on the generated keypad image, MTM table, and terminal table, and provide the generated digital signature value to the authentication server 200.

The mobile device 100 may generate the keypad image, the MTM table, and the terminal table based on one certificate selected from a previously stored certificate list by a user.

The mobile device 100 may generate a certificate password based on an area corresponding to a button input by the user based on the generated keypad image and the number of touches or clicks.

The mobile device 100 may store MTM password information including the area corresponding to the button input by the user based on the generated keypad image and the number of touches or clicks.

The mobile device 100 may compare the MTM password information input by the user with a previously stored MTM password. When a result of the comparison indicates that the input MTM password information is the same as the previously stored MTM password, the mobile device 100 may put a digital signature on the selected certificate using the certificate password, thereby generating a digital signature value.

The authentication server 200 may receive the digital signature value from the mobile device 100, and compare the received digital signature value with a previously stored digital signature value, thereby verifying whether the received digital signature value is the same as the previously stored digital signature value.

Figure 2:
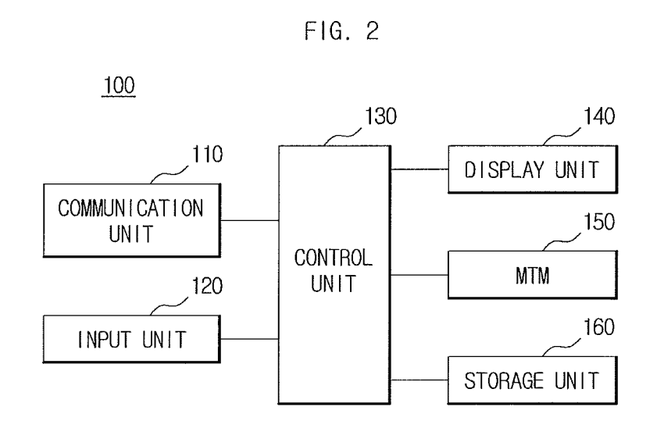
FIG. 2 is a block diagram of a mobile device according to an exemplary embodiment of the present invention.

FIG. 2 is a block diagram of a mobile device according to an exemplary embodiment of the present invention.

As shown in FIG. 2, a mobile device 100 according to an exemplary embodiment of the present invention may include a communication unit 110, an input unit 120, a control unit 130, a display unit 140, an MTM 150, a storage unit 160, and so on.

The communication unit 110 may operate in conjunction with an authentication server through wired or wireless communication, thereby exchanging various kinds of data. For example, the communication unit 110 may transmit a digital signature value to the authentication server.

The input unit 120 may receive information according to menu or key manipulation of a user.

The control unit 130 may activate a mobile application, and operate in conjunction with the MTM 150 through the activated mobile application to generate a keypad image in which buttons are irregularly arranged, an MTM table for converting keypad touch information into an actual value, and a terminal table for converting keypad image coordinates into an area in conjunction with the MTM 150, generate a digital signature value based on the generated keypad image, MTM table, and terminal table, and provide the generated digital signature value to the authentication server.

The control unit 130 may receive a previously stored certificate list from the MTM 150. When one certificate is selected from the received certificate list, the control unit 130 may transmit the selected certificate to the MTM 150, and the MTM 150 may generate the keypad image, the MTM table, and the terminal table based on the transmitted certificate.

The control unit 130 may transmit certificate password information including an area corresponding to a button input by the user based on the generated keypad image, the number of touches or clicks made by the user based on the generated keypad image, etc. to the MTM 150.

When MTM password information is received, the MTM 150 may compare the received MTM password information with a previously stored MTM password. When a result of the comparison indicates that the received MTM password information is the same as the previously stored MTM password, the MTM 150 may put a digital signature on the selected certificate using the certificate password, thereby generating a digital signature value.

The MTM 150 transmits the digital signature value generated in this way to the control unit 130, and the control unit 130 provides the transmitted digital signature value to the authentication server so that the provided digital signature value may be verified.

Here, the control unit 130 and the MTM 150 may exchange asymmetric cryptographic public keys with each other.

Through the activated mobile application, the display unit 140 may display the keypad image received from MTM 150 or the certificate password information, MTM password information input by the user, and so on.

The storage unit 160 may store the keypad image, the terminal table, the asymmetric cryptographic public keys, and so on.

Symbols of various kinds of information used in exemplary embodiments of the present invention are shown in [Table 1] below.

TABLE 1

| | |
|---|---|
| $L_{CERT}$ | Certificate list |
| $C_{SEL}$ | Selected certificate |
| $T_{PAD-M}$ | MTM password mapping table |
| $T_{PAD-T}$ | Terminal password mapping table |
| $I_{PAD}$ | Password keypad image |
| Kn | $N^{th}$ keypad input value |
| $L_{KEY}$ | List of stored user-input values |
| I(Kn) | Image corresponding to Kn |
| $P_{CERT}$ | Certificate password |
| $C_{SIGN}$ | Certificate with digital signature |
| $K_{PUB}$ | Public key |
| CERT | Actual certificate information |

Figure 3:
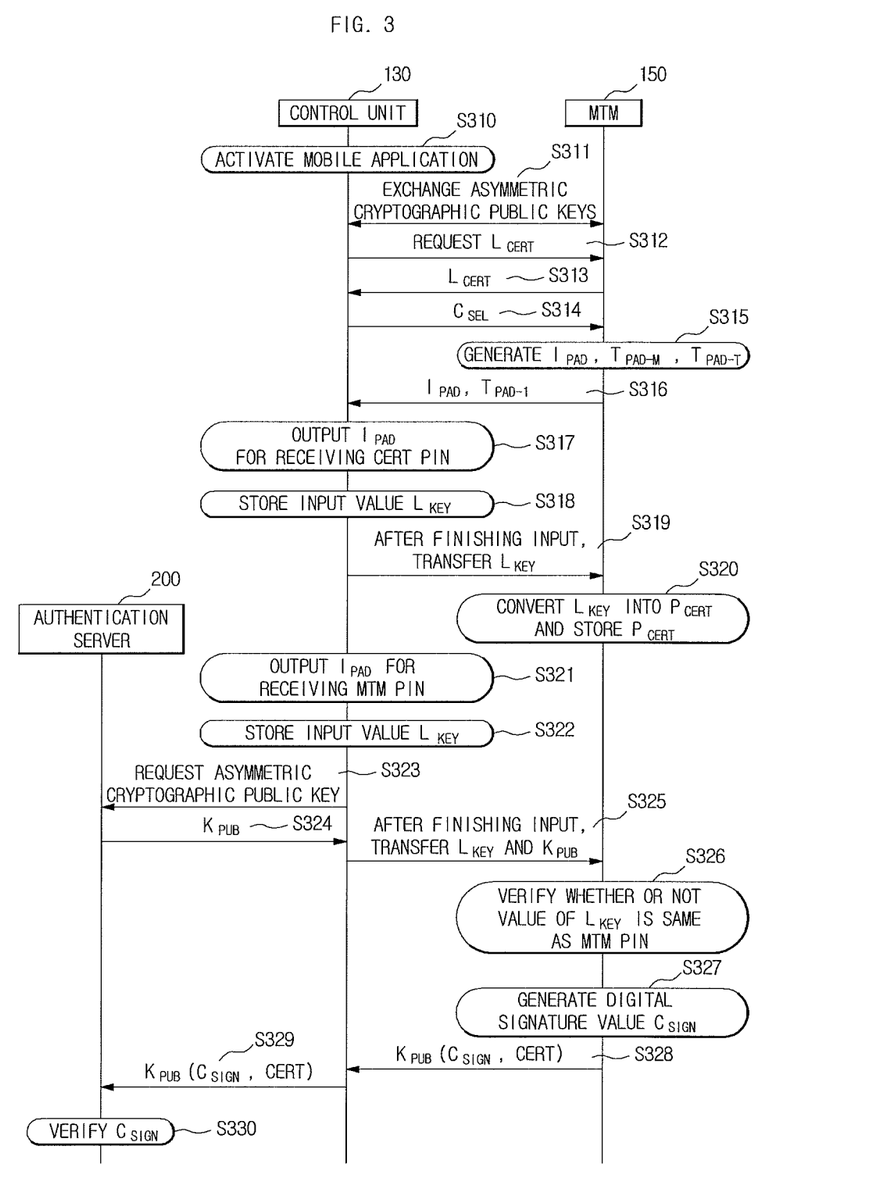
FIG. 3 is a flowchart illustrating a method of providing a digital signature according to an exemplary embodiment of the present invention.

FIG. 3 is a flowchart illustrating a method of providing a digital signature according to an exemplary embodiment of the present invention.

As shown in FIG. 3, first, a control unit 130 in a mobile device may activate a mobile application (S310), and exchange asymmetric cryptographic public keys, such as Rivest-Shamir-Adleman (RSA) public keys, with the MTM 150 through the activated mobile application (S311).

Here, the control unit 130 encrypts a message using the public key received from the MTM 150, and the MTM 150 encrypts a message using the public key received from the control unit 130.

Such a process is basically performed for message security, and messages exchanged thereafter are encrypted using exchanged public keys and transmitted.

Next, the control unit 130 may request a certificate list $L_{CERT}$ from the MTM 150 (S312). The request is made because pieces of actual certificate information are stored in the MTM 150.

Next, the MTM 150 may transmit the certificate list $L_{CERT}$ to the control unit 130 in response to the request (S313).

Next, when the certificate list $L_{CERT}$ is received, the control unit 130 may display the received certificate list $L_{CERT}$ on a screen to receive selection of any one certificate in the displayed certificate list $L_{CERT}$ from the user, and transmit the selected certificate $C_{SEL}$ to the MTM 150 (S314). Next, when the certificate $C_{SEL}$ is received, the MTM 150 may generate a keypad image $I_{PAD}$ in which buttons for inputting a password are irregularly arranged, an MTM table $T_{PAD-M}$ for converting keypad touch information input by the user into an actual value, and a terminal table $T_{PAD-T}$ for converting coordinates of the keypad image into an area touched by the user, based on the received certificate $C_{SEL}$ (S315).

Figure 4A:
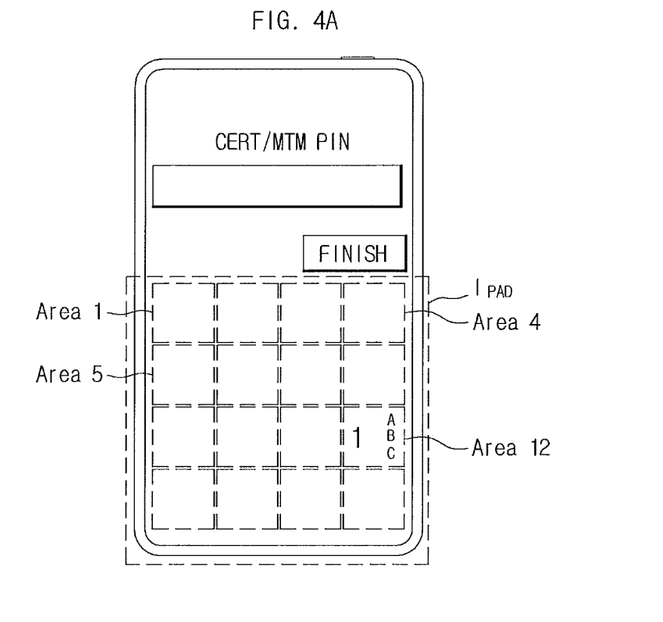
FIG. 4A is a diagram illustrating a keypad image according to an exemplary embodiment of the present invention.
Figure 4B:
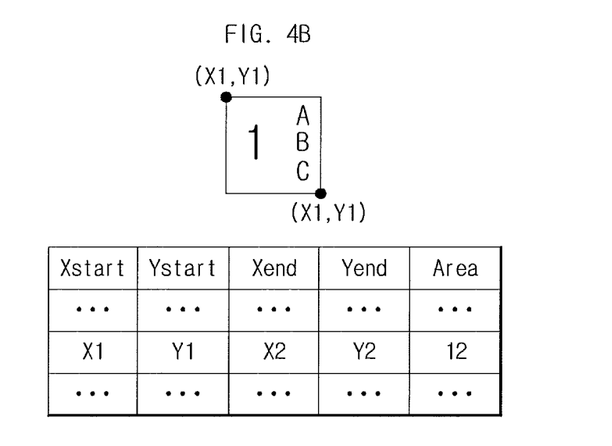
FIG. 4B is a diagram illustrating a constitution of a mobile trusted module (MTM) table according to an exemplary embodiment of the present invention.
Figure 4C:
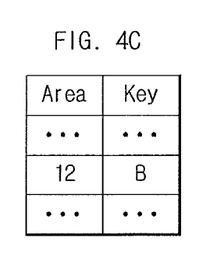
FIG. 4C is a diagram illustrating a constitution of a terminal table according to an exemplary embodiment of the present invention.

FIG. 4A is a diagram illustrating a keypad image according to an exemplary embodiment of the present invention, FIG. 4B is a diagram illustrating a constitution of an MTM table according to an exemplary embodiment of the present invention, and FIG. 4C is a diagram illustrating a constitution of a terminal table according to an exemplary embodiment of the present invention.

Referring to FIG. 4A, a keypad image $I_{PAD}$ in which buttons are irregularly arranged is shown. In the keypad image $I_{PAD}$, a plurality of keys are assigned to each keypad button as a group.

In the keypad image $I_{PAD}$, only a button to which 1, A, B, and C are assigned is displayed, and other buttons are omitted. However, numerals, letters, etc. may be assigned and displayed in the same fashion.

In the related art, a method of assigning one key to one keypad button is mainly used. Such a method allows as little movement of positions of keypad buttons as possible for convenience of input of a user, and there is a high probability of a hacker inferring a password.

However, when keypad buttons are irregularly mixed to reduce the probability of a password being inferred, input of a user may become inconvenient. Therefore, in an exemplary embodiment of the present invention, a plurality of keys are assigned to one keypad button as a group.

According to this method according to an exemplary embodiment of the present invention, it is more convenient for a user to recognize and select keys compared to the existing method even when keypad buttons are assigned to various positions to increase security.

Referring to FIG. 4B, a terminal table $T_{PAD-T}$ for converting coordinates of a keypad image touched by a user into an area is shown, and the area is denoted by, for example, x and y coordinates.

For example, a 1-ABC button is denoted by an area area 12 whose x coordinates are x1 to x2 and whose y coordinates are y1 to y2.

Referring to FIG. 4C, an MTM table $T_{PAD-M}$ for converting keypad touch information input by a user into an actual value is shown. Here, one of A, B, and C that are values displayed as a group in the specific area area 12 of the button in the keypad image $I_{PAD}$, that is, B, may be an actual value.

Values of a "Key" column in the MTM table $T_{PAD-M}$ may be randomly determined every time the keypad image $I_{PAD}$ is generated.

Keypad touch information of a user that is finally input may be in various forms. In an exemplary embodiment of the present invention, a case of converting information on coordinates in a keypad and the number of touches into an actual value is exemplified.

Next, the MTM 150 may transmit the generated keypad image $I_{PAD}$ and terminal table $T_{PAD-T}$ to the control unit 130 (S316). When the keypad image $I_{PAD}$ and the terminal table $T_{PAD-T}$ are received, the control unit 130 may display the keypad image $I_{PAD}$ for receiving a certificate password CERT PIN on the screen (S317).

When one button is selected from the keypad image $I_{PAD}$ displayed on the screen, the control unit 130 converts coordinates of the selected button into an area value using the terminal table $T_{PAD-T}$, and the area value is stored in $L_{KEY}$ (S318). Here, the area value and a value of the number of touches are included in $L_{KEY}$.

For example, if $L_{KEY}$ equals {(area, number of clicks)}, $L_{KEY}$ equals {(12, 1)} when the 1-ABC button of FIG. 4A is clicked once, and equals {(12, 2)} when the 1-ABC button is clicked once again. In other words, the number of touches increases.

Subsequently, when a button other than the 1-ABC button is touched, a new value NEW is accumulatively stored in $L_{KEY}$ as $L_{KEY}$={(12, 2), (NEW$_{AREA}$, NEW$_{CLICK}$)}.

When the control unit 130 transmits Kn=(area, number of clicks) lastly stored in $L_{KEY}$ to the MTM 150 to show the user a key value input to a "CERT/MTM PIN" area on the screen of FIG. 4A, the MTM 150 compares (area, number of clicks) with $T_{PAD-M}$ and transmits the corresponding image I(Kn) to the control unit 130.

For example, when the control unit 130 transmits (12, 2) lastly stored in $L_{KEY}$ to the MTM 150, the MTM 150 transmits an image of B, that is, a second order of keys in area 12, to the control unit 130.

When the input of the certificate password CERT PIN by the user is finished, the control unit 130 transmits an input finish message and $L_{KEY}$ to the MTM 150 (S319), and the MTM 150 may convert $L_{KEY}$ into an actual certificate password $P_{CERT}$ using $T_{PAD-M}$ and store the actual certificate password $P_{CERT}$ (S320).

Next, the control unit 130 may display the keypad image $I_{PAD}$ for receiving an MTM password MTM PIN on the screen (S321).

When one button is selected from the keypad image $I_{PAD}$ displayed on the screen, the control unit 130 converts coordinates of the selected button into an area value using the terminal table $T_{PAD-T}$, and the area value is stored in $L_{KEY}$ (S322). Here, the area value and a value of the number of touches are included in $L_{KEY}$.

When the input of the MTM password MTM PIN by the user is finished, the control unit 130 may request an asymmetric cryptographic public key, such as an RSA public key, from an authentication server 200 (S323).

Next, the authentication server 200 may transmit an asymmetric cryptographic public key $K_{PUB}$ to the control unit 130 (S324).

Next, the control unit 130 may transmit an input finish message, $L_{KEY}$, and $K_{PUB}$ to the MTM 150 (S325).

Next, the MTM 150 may convert $L_{KEY}$ into an actual value using $T_{PAD-M}$ and check whether the actual value is the same as the MTM password (S326).

When a result of the check indicates that the actual value is the same as the MTM password, the MTM 150 may put a digital signature on the selected certificate $C_{SEL}$ using the stored certificate password $P_{CERT}$, thereby generating a digital signature value $C_{SIGN}$ (S327).

On the other hand, when the result of the check indicates that the actual value is not the same as the MTM password, the MTM 150 transmits an error message to the control unit 130 without performing the next step, thereby starting the process again beginning with the step of exchanging asymmetric cryptographic public keys.

Next, the MTM 150 encrypts the generated digital signature value $C_{SIGN}$ and the actual certificate information CERT using the asymmetric cryptographic public key $K_{PUB}$ and transmits the encrypted value to the control unit (S328), and the control unit 130 may transmit the encrypted value to the authentication server 200 as it is (S329).

Next, the authentication server 200 may extract the digital signature value $C_{SIGN}$ from the encrypted value, and verify whether the extracted digital signature value $C_{SIGN}$ is the same as a previously stored digital signature value (S330).

Through this process, a mobile device according to an exemplary embodiment of the present invention may safely transfer a digital signature value to an authentication server without leaking a certificate password.

According to the above-described exemplary embodiments of the present invention, an MTM prepared in a mobile device generates a keypad image in which buttons are irregularly arranged, an MTM table for converting keypad touch information into an actual value, and a terminal table for converting keypad image coordinates into an area, stores keypad coordinate values input by a user and the number of touches made by the user based on the generated keypad image, MTM table, and terminal table, and verifies whether an actual value converted according to the stored keypad coordinate values and number of touches is the same as a previously set password, thereby preventing leakage of a password input by the user.

In addition, since exemplary embodiments of the present invention prevent leakage of an input password, it is possible to safely provide a digital signature value generated from a password to an application and an authentication server.

Although it has been described above that all of components of an exemplary embodiment of the present invention are coupled as a single unit or coupled to operate as a single unit, the present invention is not necessarily limited to such an embodiment. In other words, within the scope of the present invention, all the components may be selectively coupled to operate as one or more units. In addition, each of the components may be implemented in one separate piece of hardware, or some or all of the components may be selectively combined and implemented as a computer program having a program module that performs some or all combined functions in one piece or a plurality of pieces of hardware. Furthermore, such a computer program may be stored in computer-readable media, such as a Universal Serial Bus (USB) memory, a CD-ROM, and a flash memory, and read and executed by a computer, thereby implementing an exemplary embodiment of the present invention. Examples of the computer-readable media include magnetic recording media, optical recording media, carrier-wave media, and so on.

It will be apparent to those skilled in the art that various modifications can be made to the above-described exemplary embodiments of the present invention without departing from the spirit or scope of the invention. Thus, the exemplary embodiments should be considered in a descriptive sense only and not for purposes of limitation. It is intended that the present invention covers all such modifications provided they come within the scope of the appended claims and their equivalents.

What is claimed is:

1. A device for providing a digital signature based on a mobile trusted module (MTM), comprising:
at least one processor configured to implement:
a control unit configured to activate a mobile application and receive a selection of a certificate among a previously stored certificate list from a user through the activated mobile application which operates with the MTM, the selected certificate being used to generate, by the MTM, a keypad image in which buttons are irregularly arranged, an MTM table for converting keypad touch information into an actual value, and a terminal table for converting keypad image coordinates into an area, and
a communication unit configured to transmit a digital signature value and certificate information to an authentication server,
wherein, when a comparison of an input MTM password matches a previously stored MTM password, a digital signature is placed on the selected certificate using a certificate password input by the user based on the keypad image, the MTM table, and the terminal table to generate the digital signature value.

2. The device of claim 1, wherein the control unit receives the previously stored certificate list from the MTM through the activated mobile application, and transmits the selected certificate to the MTM when the certificate is selected from the received certificate list by the user.

3. The device of claim 1, wherein the control unit receives the keypad image and the terminal table from the MTM, and transmits information on the certificate password input based on the received keypad image by the user to the MTM.

4. The device of claim 3, wherein the MTM receives information of the certificate password from the control unit, converts the received information of the certificate password into the certificate password based on the MTM table, and stores the certificate password.

5. The device of claim 4, wherein the control unit receives MTM password information from the user based on the keypad image after completion of input of the certificate password, and receives a public key from the authentication server to transmit the received public key and the MTM password information to the MTM after completion of input of the MTM password information.

6. The device of claim 5, wherein the MTM compares the MTM password information with the previously stored MTM password when the MTM password information is received from the control unit, and puts the digital signature on the selected certificate selected by the user using the stored certificate password to generate the digital signature value when a result of the comparison indicates that the MTM password information is the same as the previously stored MTM password.

7. The device of claim 6, wherein the MTM encrypts the generated digital signature value and the certificate information using the public key, and transmits the encrypted digital signature value and certificate information to the control unit.

8. The device of claim 7, wherein the control unit transmits the encrypted digital signature value and certificate information to the authentication server through the communication unit.

9. A method of providing a digital signature based on a mobile trusted module (MTM), the method comprising:
activating, at a control unit, a mobile application and receiving a selection of a certificate among a previously stored certificate list from a user through the activated mobile application which operates with the MTM;
generating, at the MTM, a keypad image in which buttons are irregularly arranged, an MTM table for converting keypad touch information into an actual value, and a terminal table for converting keypad image coordinates into an area based on the selected certificate, the keypad image, the MTM table and the terminal table being generated using the selected certificate;

placing, when a comparison of an input MTM password matches a previously stored MTM password, a digital signature on the certificate using a certificate password input by the user based on the keypad image, the MTM table, and the terminal table to generate a digital signature value; and encrypting, at the MTM, the generated digital signature value using a public key and transmitting the encrypted digital signature value to an authentication server.

10. The method of claim 9, wherein the receiving of the selection includes receiving the previously stored certificate list from the MTM through the activated mobile application, and transmitting the selected certificate to the MTM when the certificate is selected from the received certificate list by the user.

11. The method of claim 9, wherein the generating of the digital signature value includes receiving, at the control unit, the keypad image and the terminal table from the MTM and transmitting information on the certificate password input based on the received keypad image by the user to the MTM.

12. The method of claim 11, wherein the generating of the digital signature value further includes receiving, at the MTM, the certificate password information from the control unit, converting the received certificate password information into the certificate password based on the MTM table, and storing the certificate password.

13. The method of claim 12, wherein the generating of the digital signature value further includes:

receiving, at the control unit, MTM password information from the user based on the keypad image after completion of input of the certificate password information; and receiving, at the control unit, the public key from the authentication server and transmitting the received public key and the MTM password information to the MTM after completion of input of the MTM password information.

14. The method of claim 13, wherein the generating of the digital signature value further includes:

comparing, at the MTM, the MTM password information with the previously stored MTM password when the MTM password information is received from the control unit; and putting, at the MTM, the digital signature on the selected certificate by the user using the stored certificate password to generate the digital signature value when a result of the comparison indicates that the MTM password information is the same as the previously stored MTM password.

15. The method of claim 14, wherein the transmitting of the encrypted digital signature value includes encrypting, at the MTM, the generated digital signature value and certificate information using the public key, and transmitting the encrypted digital signature value and certificate information to the control unit.

16. The method of claim 15, wherein the transmitting of the encrypted digital signature value further includes transmitting, at the control unit, the encrypted digital signature value and certificate information to the authentication server.

* * * * *